3,255,136
STABILIZATION OF POLYPROPYLENE WITH MIXTURES COMPRISING ORGANIC-PHOSPHITE-PHENOL TRANSESTERIFICATION PRODUCTS AND ESTERS OF THIODIPROPIONIC ACID
Arthur C. Hecker, Forest Hills, and Otto S. Kauder, Jamaica, N.Y., and Norman L. Perry, Wayne, N.J., assignors to Argus Chemical Corporation, Brooklyn, N.Y., a corporation of New York
No Drawing. Filed Apr. 7, 1965, Ser. No. 446,422
20 Claims. (Cl. 260—23)

This application is a continuation-in-part of copending applications Serial Nos. 32,087, filed May 27, 1960, and 36,118, filed June 15, 1960, now abandoned.

This invention relates to stabilizer combinations useful in the stabilization of polypropylene against degradative deterioration in physical properties as a result of exposure to light and air, particularly at elevated temperatures, and over long periods of time, and to polypropylene compositions having increased stability against deterioration in physical properties over long periods of time due to the presence of such stabilizers, and to a process of stabilizing polypropylene, employing such stabilizers.

Polypropylene is a tough, high-melting polymeric material, but in several respects its stability leaves much to be desired. The polymer shows a tendency to decrease rapidly in melt viscosity and then to become brittle when kept at elevated temperatures for the time required in milling, calendering, extrusion, injection molding and fiber-forming equipment. This deterioration is particularly serious when the polymer is worked in the molten state in the presence of oxygen, e.g., air. Shaped polymers prepared in such equipment show a tendency to discolor, to become distorted, to crack, and to powder around the edges upon exposure to sunlight and during ageing, and especially when heated at elevated temperatures, really, an accelerated ageing process, and again, the problem is accentuated in the presence of oxygen.

To meet commercial requirements, it is, of course, quite important that the polymer retain its physical properties during processing and thereafter. However, the art has experienced great difficulty in achieving the necessary stabilization. In all probability, the changes leading to this deterioration in physical properties arise from chemical modification of the polymer. Whether this modification is due to oxidation or to some other effect is not yet known. Lack of knowledge of the reason naturally has hindered the development of satisfactory stabilizers.

Considerable research over the past few years to solve these problems has led to the suggestion of a variety of stabilizers to counteract one or more of these difficulties. Most polypropylene on the market today contains one of these stabilizers. However, no stabilizer or combination of stabilizers has yet been disclosed which is capable of coping with all of the stabilization problems. While it is now possible to stabilize polypropylene fairly well against deterioration in melt viscosity, this stabilization is not always accompanied by an inhibition of deterioration in other respects, such as resistance to embrittlement and discoloration at elevated temperatures. Stabilizers which can cope with embrittlement are not capable of preventing discoloration, or reduction in melt viscosity. Retention of physical properties over long periods of time is particularly difficult to achieve.

Logically, it would seem that if one stabilizer does not do the entire job, a combination should. Groups of stabilizers, called "stabilizer systems," have been proposed. However, the effect of a plurality of stabilizers is impossible to predict from their effects individually, because the possible effects multiply with the number of stabilizers in the system. A stabilizer to be effective at all must be a reactive substance, and stabilizers can react with each other as well as with the polypropylene and with whatever leads to the deterioration. The various stabilizers thus can and do introduce unpredictable and undesirable side effects by reactions between themselves, and stabilizers which are capable of improving resistance to deterioration in some ways when combined may actually offset their individual effect, and decrease the rate of deterioration in that or in other respects. This may be due to one stabilizer's effecting the desired improvement, and another stabilizer's reacting with and removing the first, and the reaction product's accelerating the deterioration. In these circumstances, developing a stabilizer system which is capable of producing a polypropylene that has a good over-all resistance to all of the deteriorative tendencies is obviously a quite complex problem. Up until now, the art has not known how to formulate such a system.

A further problem arises from the fact that polypropylenes tend to differ in their deteriorative tendencies according to the process by which they are prepared. Apparently, molecular weight and stereo-regularity (tacticity) are factors.

If the polypropylene manufacturer knows the use to which his polymer is to be put, he can of course tailor his stabilizers so as to meet fairly well the conditions to be encountered. However, such a stabilized polymer may not be useful for other purposes. In the absence of any better way, the manufacturers have made available a great variety of polypropylenes for special purposes. Unless the customer can fit into one or more of the categories of special purpose materials, however, he may be in for a hard time. And if the material he wants is temporarily unavailable, he has to wait.

There exists a definite need for a stabilizer which will make any polypropylene sufficiently stable to be useful in all important processing methods and equipment, and which can be incorporated by the converter as well as by the manufacturer, if necessary to meet a special problem.

In accordance with the instant invention, such an all-purpose stabilizer system is provided. This stabilizer system not only improves the resistance of the polymer to discoloration and embrittlement upon exposure to air and light at normal atmospheric and at elevated temperatures, particularly over long periods of time, but also improves the resistance of the polymer to reduction in melt viscosity when worked at elevated temperatures in the presence of oxygen.

The stabilizer system of the invention comprises three stabilizers, an organic mono- or polyhydric phenol, an organic phosphite, and a thiodipropionic acid ester. An additional fourth ingredient which is included in the preferred systems of the invention, but which is not essential, is a polyvalent metal salt of an organic acid. These three and four stabilizers together give an enhanced stabilization which is not obtainable from any of them alone or in combinations of two. When taken alone, the components of this stabilizer system are capable only of inhibiting deterioration in one or two respects, and quite large amounts may be needed before any effect is noted. In pairs, a depressant effect on the stabilizing effect of the individuals may be noted. For example, the phenol alone gives an improved resistance to embrittlement and reduction in melt viscosity at elevated temperatures, but little assistance as to maintenance of color. The phosphite alone is a rather poor stabilizer in preventing deterioration in the first two properties, but it does assist in resisting discoloration. The two together are worse than the phenol alone in every respect except color, which is intermediate.

The thiodipropionic acid ester by itself only improves resistance to embrittlement. The polyvalent salt of an organic acid by itself only prevents discoloration. In combinations with the phenol, the color is worse than with the salt alone, and in combinations with phosphite only discoloration is prevented.

In view of this, it is surprising that the phenol, phosphite and thiodipropionic acid ester taken together in the same total amount not only prevent discoloration but also embrittlement and inhibit reduction in melt viscosity, and furthermore the resistance to discoloration and embrittlement on ageing is very greatly enhanced, to far beyond that obtainable from the components themselves. This enhanced stabilizing activity is obtained with any polypropylene, regardless of the process by which it is prepared.

The components of the stabilizer combination of the invention should have a very low vapor pressure at the working temperature, so that they will not be lost from the mix during hot-working, which in some instances requires a considerable period of time. Preferably, they are substantially nonvolatile at this temperature. They also should be compatible with the resin at all temperatures to which the composition is to be subjected.

The phenol contains one or more phenolic hydroxyl groups, and may contain one or more phenolic nuclei. In addition, the phenolic nucleus may contain an oxy or thio ether group.

The alkyl-substituted phenols and polynuclear phenols because of their molecular weight have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatability with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in any alkyl, alicyclene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one ring, or in the same or different rings, if there are more than one. In the case of bicyclic phenols, the rings can be linked by thio or oxyether groups, or by alkylene, alicyclene or arylene groups. Such phenols, which are preferred because of their superior stabilizing action, can be defined by the formula:

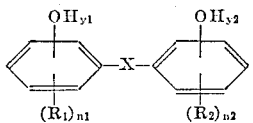

where X is an oxygen or sulfur atom, or an alkylene or alicyclene or arylene or a mixed alkylene-alicyclene or alkylene-arylene group, having a straight or branched chain, whose total number of carbon atoms ranges from one to about eighteen, $y_1$ and $y_2$ are the number of phenolic hydroxyl groups, OH, $n_1$ and $n_2$ are the number of R groups and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are

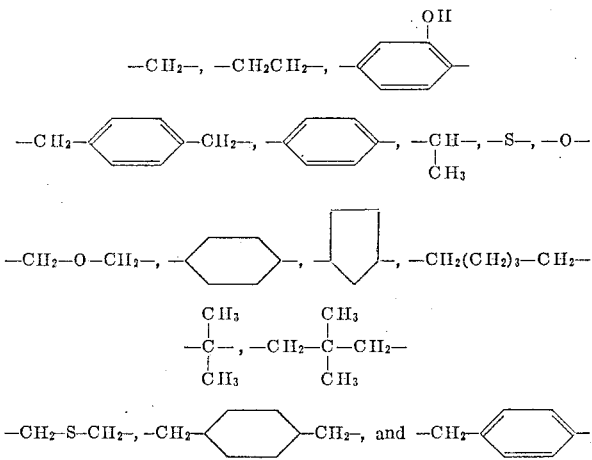

The various X and R groups are exemplified in the following compounds.

Exemplary of satisfactory monohydric phenols are 2,6-di-tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol, propyl gallate, catechol, resorcinol, p-octyl resorcinol, p-dodecyl resorcinol, p-octadecyl catechol, p-isooctyl-phloroglucinol, pyrogallol, hexahydroxy benzene, p-isohexyl catechol, 2,6-ditertiary butyl resorcinol, 2,6-diisopropyl phloroglucinol, methylenebis - (2,6 - ditertiary butyl-m-cresol), methylenebis-(2,6-ditertiary butyl phenol), 2,2-bis(4-hydroxy phenyl) propane, methylenebis-(p-cresol), 4,4'-thiobisphenol, 4,4'-oxobis-(3-methyl-6-isopropyl phenol), 4,4'-thiobis(3-methyl-6-tertiary butyl phenol), 2,2'-oxobis-(4-dodecyl phenol), 2,2'-thiobis(4-methyl-6-tertiary butyl phenol), 2,6-diisooctyl resorcinol, 4,4'-n-butylidenebis - (2 - tertiary-butyl 5-methylphenol), 4,4'-benzylidenebis (2-tertiary-butyl-5-methyl phenol), 2,2'-methylenebis-(4-methyl-6-1'-methylcyclohexylphenol), 4,4'-cyclohexylidenebis-(2-tertiary-butylphenol), 2,6 - bis-(2' - hydroxy-3'-tertiarybutyl-5'-methylbenzyl)-4-methylphenol, 4-octyl pyrogallol, and 3,5-ditertiary butyl catechol.

The organic phosphite can be any organic phosphite having the formula $(RA)_3P$ in which A can be oxygen or sulfur or a mixture of the same, and R can be selected from the group consisting of aryl, alkyl, cycloalkyl, aralkyl and alkaryl groups, in any combinations. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, di-isooctyl monotolyl phosphite, tri-2-ethyl hexyl phosphite, phenyl dicyclohexyl phosphite, phenyldiethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri (t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, dodecyl thiodiphenyl phospite and tert-butyl phenyl thio-di-2-ethylhexyl phosphite.

The thiodipropionic acid ester has the following formula:

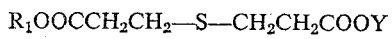

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

—XO[OCCH₂CH₂SCH₂CH₂COOXO]
$_n$OCCH₂CH₂—S—CH₂CH₂COOZ where Z is hydrogen, $R_2$ or M, $n$ is the number of thiodipropionic acid ester units in the chain, and X is a bivalent hydrocarbon group of the type of $R_1$ that is, alkylene, alkenylene, cycloalkylene, mixed alkylene-arylene and mixed alkylene-cycloalkylene radicals; hydroxyalkylene and hydroxyalkyloxyalkylene radicals; and esters thereof with aliphatic carboxylic acids; the value of $n$ can range upwards from 0, but there is no upper limit on $n$ except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) R₁OOCCH₂CH₂SCH₂CH₂COOH (b) R₁OOCCH₂CH₂SCH₂CH₂COOR₂

(c) R₁O[OCCH₂CH₂SCH₂CH₂COOX—O]
$_n$OCCH₂CH₂SCH₂CH₂COOZ (d) R₁OOCCH₂CH₂SCH₂CH₂COOM

In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

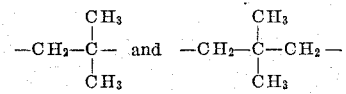

arylene radicals such as phenylene

methylenephenylene

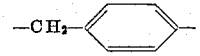

dimethylene phenylene

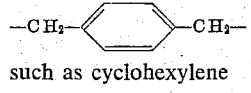

and alicyclylene such as cyclohexylene

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

The polyvalent metal salt of an organic acid will have ordinarily from about six to about twenty-four carbon atoms. The polyvalent metal can be any metal of Group II of the periodic table, such as zinc, calcium, cadmium, barium, magnesium, and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals, and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where the salts are not known, they are made by the usual types of reaction, such as by mixing the acid, acid chloride or anhydride with the corresponding oxide or hydroxide of the metal in a liquid solvent, and heating, if necessary, until salt formation is complete.

A sufficient amount of the stabilizer combination is used to improve the stability against deterioration in physical properties, including, for example, discoloration, reduction in melt viscosity and embrittlement, under the conditions to which the polypropylene will be subjected. Very small amounts are usually adequate. Amounts within the range from about 0.005 to about 5% total stabilizers by weight of the polypropylene are satisfactory. Preferably, from 0.1 to 2.5% is employed for optimum stabilization.

Preferably, the stabilizer system comprises from about 0.025 to about 0.5% of the phenol, from about 0.05 to about 1.25% of the phosphite, from about 0.05 to about 1% of the thiodipropionic acid ester, and from about 0.025 to about 0.75% of the polyvalent metal salt, when present. More than 1% of the phenol and more than 3.5% of the total stabilizers may evidence a lessened stabilizing effect or even a depressing effect on stabilization at high temperatures above 275° C.

The stabilizer system of the invention can be formulated as a simple mixture for incorporation in the polymer by the polymer manufacturer or by the converter. An inert organic solvent can be used to facilitate handling, if the ingredients do not form a homogeneous mixture or solution. In some cases, the phenol is not very soluble in the phosphite at normal ambient temperatures.

Any difficulty in compatibility of phosphite and phenol is no problem if the mix is to be incorporated directly in the polymer. If the stabilizer system is to be sold as such, the compatibility can be improved by heating the phosphite and phenol at an elevated temperature for a sufficient time to form a homogeneous solution. This solution is quite stable at ambient temperatures and even below. Temperatures of from 100 to 200° C. can be used, under reflux if necessary. A small amount, from 0.02 to 1%, of an alkali or alkaline earth metal, as such or in the form of a compound which forms a salt with the phenol, such as the metal, the oxide or hydroxide, such as sodium hydroxide, potassium hydroxide, calcium oxide and calcium hydroxide, or the phenolate such as sodium phenolate, should be present to expedite the reaction, which is believed to be a transesterification of phosphite ester with the phenol, due to the fact that the alcohol or phenol that would be liberated by hydrolysis of the phosphite can be distilled out of the reaction mixture. The reaction will proceed without distillation of the hydrolysis reaction product from the mixture up to an equilibrium point, short of completion. Transesterification need not be complete; only a little, involving perhaps ⅓ of the phosphite ester groups of a triphosphite and ½ of the phenol groups of a dihydric phenol on a mole-for-mole basis, is enough to make phosphite and phenol compatible, and stripping is unnecessary to effect a transesterification to this extent.

Polypropylene solid polymer can be defined in a manner to differentiate it from other polyolefins as having a density within the range of from 0.86 to 0.91, and a melting point above 150° C. The stabilizer system of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade names Pro-Fax, Escon and Olefane and having a softening or hot-working temperature of about 350° F., is an example of a sterically regular polypropylene polymer.

Mixtures of polypropylene with other compatible polymers and copolymers of polypropylene with copolymerizable monomers not reactive with the polypropylene stabilizer combination also can be stabilized, for example, mixtures of polyethylene and polypropylene, and copolymers of propylene and ethylene which have a sufficient amount of propylene to present the instability problem that is resolved by the stabilizer combinations of the invention.

The stabilizer combination is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The stabilizing effect of the stabilizer systems of the invention was evaluated in the working examples which follow in accordance with the following test procedures. The standard sample used in testing was 200 g., except for the Brabender Plastograph, which was 35 g. The stabilizers were incorporated as described in the working example and milled to a sheet. Pieces cut from the milled sheet were then used in the test procedures.

*Brabender Plastograph (reduction in melt viscosity)*

This instrument is essentially a heated sigmablade mixer in which the torque applied to the blades at 60 r.p.m. is continuously measured and plotted on a chart as kg.-cm. of torque. The bowl is maintained at 193° C. The charge is 35 g. polypropylene. Temperature of the plastic is 205–215° C., owing to frictional heat build-up.

*Oven test, 205° C. (heat stability)*

Small squares cut from a milled sheet are exposed in a forced-draft air oven lying flat on aluminum foil. Samples are removed at 15-minute intervals and examined for loss of shape, flow-out, or melting, which constitute failure. Color is noted at failure.

*Compression molding, 190° C. (resistance to embrittlement and loss of plasticity)*

Pieces cut from a milled sheet are compression-molded at 190° C. for five minutes to give 6 x 6-inch slabs 20 mils (about 0.5 mm.) or 75 mils thick. Plasticity and color are then noted.

*Heat ageing, 150° C. oven (heat stability of molded samples)*

Molded samples made as above are heated flat on aluminum foil in an air circulating oven at 150° C. Samples are removed daily and examined for cracking or powdering, either of which constitutes failure. Color is noted at the end of two days, if the sample has not yet failed.

*Weatherometer (resistance to light deterioration)*

The molded samples are held in a weatherometer at 51° C. black panel temperature, and noted every 16⅔ hours for development of cracking or powdering, either of which constitutes failure. Color is noted at the end of fifty hours.

*Compression molding at high temperature, 287° C. (550° F.), (resistance to embrittlement and loss of plasticity at high temperatures)*

Moldings are made as above, held in the mold thirty minutes at 287° C. (550° F.), cooled and examined for color and plasticity. Unstabilized as well as overstabilized formulations crack and discolor under these conditions.

The above tests are referred to in the examples as the standard tests.

The following examples in the opinion of the inventors represent the best embodiments of their invention.

EXAMPLE 1

The stabilizer system of the invention was evaluated against the stabilizing effect of the various components thereof, taken singly and in pairs. The stabilizers used were 4,4'-cyclohexylidene-bis-(2-tertiary butyl phenol), isooctyl diphenyl phosphite, and dilauryl thiodipropionate. In each case, a total of 0.5% stabilizer was used. Stabilizers were weighed and dispersed by hand stirring in powdered previously unstabilized polypropylene (Profax 6501), reduced specific viscosity (RSV) 3.0, melt index 0.4, ASTM DI238–57T at 190° C. The mixture was placed on a 2-roll mill and fluxed for five minutes at 170±2° C. Pieces cut from the mill sheet were used in the standard tests described above. The parts of stabilizer given are per 100 parts of polypropylene resin.

*Table I*

| Stabilizer System | A | B | C | D | E | F | G |
|---|---|---|---|---|---|---|---|
| 4,4'-cyclohexylidene-bis(2-tertiary butyl phenol) | 0.2 | 0.6 | | | | 0.3 | 0.3 |
| Isooctyl diphenyl phosphite | 0.2 | | 0.6 | | | 0.3 | 0.3 |
| Dilaurylthiodipropionate | 0.2 | | | 0.6 | 0.3 | | 0.3 |

The data obtained in the standard tests showed that the stabilizer system of the invention provides much better resistance to general deterioration in physical properties than any of the components taken singly or in pairs in the same amount. Reduction in melt viscosity was small in 45 minutes, and heat stability, resistance to embrittlement and loss of plasticity, at low and high temperatures, and resistance to light deterioration, are all rated as excellent. The stabilizer system of the invention is the only one of the group tested which is satisfactory in all tests as an all around stabilizer. The enhanced effect in resistance to deterioration on ageing at elevated temperatures is especially outstanding, inasmuch as the stabilizer system of the invention gives stability for well in excess of one month, as compared to only several days for the other combinations tested.

EXAMPLE 2

A series of stabilized polypropylene compositions were prepared, using varying quantities of stabilizing systems in accordance with the invention. A blend of phosphite and phenol was prepared before incorporation with metal salt, the thiodipropionic acid ester, and the resin, to prevent separation of the bisphenol. 100 g. of 4,4'-thiobis(2-tertiary-butyl-5-methylphenol), 150 g. isooctyl diphenyl phosphite, and 0.5 g. of calcium hydroxide were stirred and heated at 120 to 125° C. for three hours, at atmospheric pressure, without stripping to remove phenol. At the end of this time, a clear brown solution had formed, and this solution remained homogeneous at room temperature. As a test to show that transesterification had occurred, when a portion of the reaction mixture was heated at 125 to 135° C. under reduced pressure, phenol was distilled off. The remainder of the unstripped 40% concentrate (content 40% total, 4,4'-thiobis(2-tertiary-butyl-5-methyl-phenol) was combined with more isooctyl diphenyl phosphite and with zinc 2-ethylhexoate, to yield a stabilizer blend of the following composition:

| | Parts |
|---|---|
| 4,4'-thiobis(2-t-butyl-5-methylphenol) | 100 |
| Isooctyl diphenyl phosphite | 275 |
| Zinc 2-ethylhexoate | 125 |

This composition was blended with polypropylene (Profax 6501), in some cases with dilauryl thiodipropionate, in the amounts indicated in the table below, using the procedure of Example 1, and the resistance to ageing and other properties evaluated by the standard tests. The heat ageing test results are given in the table.

*Table II*

| Stabilizer System | Mixture [1] | Dilauryl thiodipropionate | Heat Ageing, Molded 20 Mil Specimens, 150° C. | |
|---|---|---|---|---|
| | | | Days to Failure | Color, 2 Days |
| A | 0 | 0 | 1 | Colorless. |
| B | 0.25 | 0 | 3 | Do. |
| C | 0.50 | 0 | 6 | Do. |
| D | 1.00 | 0 | 8 | Do. |
| E | 0 | 0.3 | 3 | Do. |
| F | 0 | 1 | 3 | Do. |
| G | 0.10 | 0.3 | 4 | Do. |
| H | 0.25 | 0.3 | 6 | Do. |
| I | 0.45 | 0.1 | 15 | Do. |
| J | 0.45 | 0.2 | 26 | Do. |
| K | 0.45 | 0.3 | 34 | Do. |
| L | 0.35 | 0.5 | 40 | Do. |
| M | 0.55 | 0.3 | 37 | Do. |
| N | 0.75 | 0.3 | 34 | Do. |

[1] 4,4'-thiobis(2-tertiary butyl-5-methylphenol)—Isooctyl diphenyl phosphite zinc 2-ethylhexoate.

The very considerable improvement in resistance to ageing at 150° C. due to the dilauryl thiodipropionate is evident from the data. Reduction in melt viscosity was small in 45 minutes, and heat stability, resistance to embrittlement and loss of plasticity, at low and high temperatures, and resistance to light deterioration, are all rated as excellent.

EXAMPLE 3

A variety of stabilizer systems were prepared, using the method described in Example 2, and the various mono- and diphenols described in the table below. The concentrates of phenol and phosphite were prepared exactly as set forth in Example 2, without stripping to remove phenol. These concentrates were blended with zinc 2-ethylhexoate, and half of the resulting compositions were blended with dilauryl thiodipropionate. The resulting stabilizer systems contained 100 parts of the phenol, 250 parts of isooctyl diphenyl phosphite, and 250 parts of zinc 2-ethylhexoate. To half of this was added 150 parts of dilauryl thiodipropionate. These two systems were incorporated in polypropylene (Profax 6501) according to the procedure of Example 1, the system not containing dilauryl thiodipropionate in the concentration of 0.6%, and the system containing dilauryl thiodipropionate in the concentration of 0.9%. The resin blends were tested by the standardized test procedures, in comparison with Profax 6501 alone. The results for the heat ageing test are shown in the table.

hexoate and with 150 parts of dilauryl thiodipropionate. The resulting systems were tested by the standard tests in blends with Profax 6501, prepared as in Example 1, in a concentration of 0.5 part per 100 of resin. The results in the heat ageing test are given in the table.

*Table IV*

| Stabilizer System | V | W | X | Y | Z |
|---|---|---|---|---|---|
| Phosphite | Triphenyl phosphite | Tri(nonylphenyl) phosphite | Tri(2-ethyl hexyl) phosphite | Phenyl di(2-ethyl hexyl) phosphite | Mixed 2-ethylhexyl (octylphenyl) phosphite |
| Heat Ageing (150° C.): | | | | | |
| Days to Failure | Over 20 | Over 20 | Over 20 | Over 20 | Over 20. |
| Color, 2 Days | Colorless | Colorless | Colorless | Colorless | Colorless. |

It is apparent that each of these phosphites in combination with the dilauryl thiodipropionate, phenol and zinc salt is capable of imparting excellent resistance to ageing to the polypropylene. The resin had excellent color re-

*Table III*

| No. | Phenol | Heat Ageing, Molded 20 Mil Specimens, 150° C. | | | |
|---|---|---|---|---|---|
| | | Days to Failure | | Days to Failure | |
| | | No Dilauryl thiodipropionate | Color 2 Days | 0.3% Dilauryl thiodipropionate | Color 2 Days |
| O | 4,4'-thiobis (2-t-butyl-5-methylphenol) | 6 | Colorless | | |
| O' | ----do---- | | | 32 | Colorless. |
| P | 4,4'-n-butylidenebis(2-t-butyl-5-methylphenol) | 6 | Colorless | | |
| P' | ----do---- | | | 31 | Do. |
| Q | 4,4'-cyclohexylidenebis(2-t-butylphenol) | 4 | Colorless | | |
| Q' | ----do---- | | | 22 | Do. |
| R | 4,4'-isobutylidene-bis-(2-t-butylphenol) | 4 | Colorless | | |
| R' | ----do---- | | | 18 | Do. |
| S | 2,6-di-t-butyl-4-methylphenol.[1] | 1 | Colorless | | |
| S' | ----do---- | | | Over 5 | Do. |
| T | 2-t-butyl-4-methoxyphenol | 1 | Colorless | | |
| T' | ----do---- | | | Over 5 | Do. |
| | Propyl gallate | 1 | Colorless | | |
| ' | ----do---- | | | Over 5 | Do. |

[1] In this experiment tri-(nonylphenyl)phosphite was used.

It is apparent that each of these phenols in the stabilizer system of the invention is capable of imparting excellent resistance to ageing at elevated temperatures. The importance of the dilauryl thiodipropionate is evident from the data. Reduction in melt viscosity was small in 45 minutes, and heat stability, resistance to embrittlement and loss of plasticity, at low and high temperatures, and resistance to light deterioration, are all rated as excellent.

EXAMPLE 4

A variety of stabilizer systems in accordance with the invention were prepared, employing different organic phosphites. The procedure of Example 2 was followed in preparing a stable concentrate of 4,4'-thiobis(2-tertiary-butyl-5-methylphenol) and the phosphite named in the table. 100 g. of the phenol, 150 g. of the phosphite and 0.3 g. of metallic sodium, forming the sodium phenolate in situ, were stirred and heated from 120 to 125° C. for three hours, at atmospheric pressure, forming a homogeneous, clear, brown solution. This unstripped concentrate (250 parts) was combined with 75 parts zinc 2-ethyl-hexoate and with 150 parts of dilauryl thiodipropionate. tention after the ageing. Reduction in melt viscosity was small in 45 minutes, and heat stability, resistance to embrittlement and loss of plasticity, at low and high temperatures, and resistance to light deterioration, are all rated as excellent.

EXAMPLE 5

A series of stabilizer systems were prepared, with and without the polyvalent metal salt. The composition of these systems is given in the table below. The concentrates of phenol and phosphite were prepared as set forth in Example 2, without stripping to remove phenol.

A corresponding group of systems were prepared without dilauryl thiodipropionate, so as to show the effect of this component.

All of the stabilizer systems were incorporated in polypropylene (Profax 6501) according to the procedure of Example 2. The amounts of each stabilizer per 100 parts of resin are given in the table. These resin blends were tested by the standardized test procedures. The results of the heat ageing test are shown in the table.

Table V

| Stabilizer System | Percent 4,4'-thiobis-2-tertiary-butyl-5-methylphenol | Percent isooctyl diphenyl phosphite | Percent zinc 2-ethyl hexoate | Heat Ageing, Molded 20 Mil Specimens, 150° C. | | | |
|---|---|---|---|---|---|---|---|
| | | | | Days to Failure | | Days to Failure | |
| | | | | No Dilauryl thiodipropionate | Color 2 days | 0.3% Dilauryl thiodipropionate | Color 2 Days |
| AA | 0.01 | 0.24 | 0 | 2 | Colorless | | Colorless. |
| BB | 0.01 | 0.24 | 0 | | | 6 | |
| CC | 0.02 | 0.48 | 0 | 3 | Colorless | | |
| DD | 0.02 | 0.48 | 0 | | | 18 | Do. |
| EE | 0.1 | 0.25 | 0 | 5 | Colorless | | |
| FF | 0.1 | 0.25 | 0 | | | ¹38 | Do. |
| GG | 0.06 | 0.28 | 0.16 | 4 | Colorless | | |
| HH | 0.06 | 0.28 | 0.16 | | | 26 | Do. |
| II | 0.07 | 0.19 | 0.24 | 4 | Colorless | | |
| JJ | 0.07 | 0.19 | 0.24 | | | 27 | Do. |

¹ 0.5% Dilauryl thiodipropionate.

Excellent resistance to heat ageing at elevated temperatures was obtained. The significance of the dilauryl thiodipropionate is evident from the data. Reduction in melt viscosity was small in 45 minutes, and heat stability, resistance to embrittlement and loss of plasticity, at low and high temperatures, and resistance to light deterioration, are all rated as excellent.

EXAMPLE 6

A series of stabilizer systems were prepared, containing 300 parts each of one of a variety of thiodipropionic acid esters. The other stabilizers present were 100 parts 4,4'-thiobis-(2-tertiary-butyl-5-methylphenol), 275 parts isocotyl diphenyl phosphite, and 125 parts zinc 2-ethylhexoate. These were combined with polypropylene (Profax 6501), in the proportion of 0.8 part total stabilizers per 100 parts of resin. The stabilizers were prepared, weighed and dispersed in the powdered polypropylene according to the procedure set forth in Example 2.

Table VI

| No. | Thiodipropionic Acid Ester | Heat Ageing, 20 Mil Specimens, 150° C. | |
|---|---|---|---|
| | | Days to Failure | Color, 2 Days |
| KK | Di-2-ethylhexyl thiodipropionate | Over 20 | Colorless. |
| LL | Diisodecyl thiodipropionate | do | Do. |
| MM | Mixed coconut fatty alcohol diesters of thiodipropionic acid. | do | Do. |
| NN | Mixed tallow fatty alcohol diesters of thiodipropionic acid. | do | Do. |
| OO | Monoglyceryl ester of thiodipropionic acid. | do | Do. |
| PP | Glyceryl monostearate diester of thiodipropionic acid. | do | Do. |
| QQ | Disorbityl thiodipropionate | do | Do. |
| RR | Polyester of hexamethylene glycol and thiodipropionic acid. | do | Do. |
| SS | Monobenzyl ester of thiodipropionic acid. | do | Do. |
| TT | Di-(p-t-butylphenyl)-thiodipropionate. | do | Do. |
| UU | Dioleyl thiodipropionate | do | Do. |
| VV | Monolauryl cadmium thiodipropionate. | do | Do. |
| WW | Zinc p-dodecylbenzyl thiodipropionate. | do | Do. |
| XX | Polyester of triethylene glycol and thiodipropionic acid. | do | Do. |

Excellent resistance to ageing at elevated temperatures was evidenced. Reduction in melt viscosity was small in 45 minutes, and heat stability, resistance to embrittlement and loss of plasticity, at low and high temperatures, and resistance to light deterioration, are all rated as excellent.

EXAMPLE 7

A variety of stabilizer systems were prepared in accordance with the invention, employing various polyvalent metal salts. The polypropylene used (Profax 6501) was mixed with the unstripped stabilizer system prepared according to the procedure of Example 2, and the milled sheets employed in the standardized test. Each stabilizer system contained per 100 parts of resin 0.1 part of 4,4'-thiobis-(2-tertiary-butyl-5-methylphenol), 0.25 part isooctyl diphenyl phosphite, 0.3 part dilauryl thiodipropionate, and the polyvalent metal salt. The quantity of metal salt was chosen so as to supply approximately the same number of chemical equivalents of each metal. The following test data were obtained.

Table VII

| No. | Polyvalent Metal Salt | Amount | Heat Ageing, 150° C. | |
|---|---|---|---|---|
| | | | Days to Failure | Color, 2 Days |
| AB | Zinc 2-ethylhexoate (50% solution).¹ | 0.2 | Over 20 | Colorless. |
| AC | Calcium 2-ethylhexoate (50% solution).² | 0.2 | do | Do. |
| AD | Magnesium 2-ethylhexoate (50% solution).² | 0.19 | do | Do. |
| AE | Strontium 2-ethylhexoate (50% solution).² | 0.21 | do | Do. |
| AF | Cadmium 2-ethylhexoate (50% solution).³ | 0.22 | do | Do. |

¹ 150–200° C. petroleum ether, as solvent.
² Methyl ethyl ketone, as solvent.
³ 150–200° C. petroleum ether and 2-ethoxyethanol, as solvent.

The very considerable resistance to ageing at 150° C. is evident from the data. Reduction in melt viscosity was small in 45 minutes, and heat stability, resistance to embrittlement and loss of plasticity, at low and high temperatures, and resistance to light deterioration, are rated as excellent.

Example 8

The stabilizer system of Example 2–L was employed to stabilize a variety of polypropylenes. The reduced specific viscosity and melt index of these polypropylenes are given in Table VIII. 100 parts of the polypropylene was milled in the usual way with 0.5 parts of the stabilizer system of Example 2–L.

Table VIII

| Polymer No. | R.S.V. | Melt Index | Heat Ageing, 150° C. | |
|---|---|---|---|---|
| | | | Days to Failure | Color, 2 Days |
| BA | 5.1 | 0.34 | Over 20 | Colorless. |
| BC | 3.5 | 0.57 | do | Do. |
| BD | 7.9 | 0.14 | do | Do. |
| BE | 7.3 | 0.18 | do | Do. |
| BF | 2.4 | 2.3 | do | Do. |
| BG | 3.8 | 0.49 | do | Do. |

The very considerable resistance to heat ageing at 150° C. of the stabilized polypropylenes is evident from the data. Reduction in melt viscosity was small in 45 minutes, and heat stability, resistance to embrittlement and loss of plasticity, at low and high temperatures, and resistance to light deterioration, are all rated as excellent.

We claim:
1. A stabilizer composition for use in improving resistance of polypropylene to deterioration in physical properties on exposure to light and heat, consisting essentially of
    (a) a transesterified reaction product of an organic phenol in an amount of from about 1 to about 20 parts by weight and an organic phosphite triester free from phenolic hydroxyl groups in an amount of from about 0.1 to about 50 parts by weight, obtained by a transesterification of the phenol and phosphite at an elevated temperature sufficient to form a homogeneous mixture, and
    (b) an ester of thiodipropionic acid in an amount of from about 0.1 to about 40 parts by weight, said stabilizer combination being compatible with polypropylene and having a low vapor pressure at polypropylene working temperatures.

2. A stabilizer combination in accordance with claim 1 in which the phenol is a monohydric phenol.

3. A stabilizer combination in accordance with claim 1 in which the phenol is a polyhydric phenol.

4. A stabilizer combination in accordance with claim 1 in which the phenol has the formula:

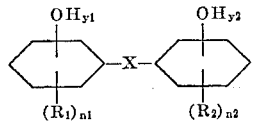

where X is selected from the group consisting of oxygen, sulfur, alkylene, alicyclene, arylene, and mixed alkylene-arylene and alkylene-alicyclene groups, the R groups are selected from the group consisting of hydrogen and alkyl groups having from one to about eighteen carbon atoms, and $y$ and $n$ represent the number of OH and R groups per ring, and in each ring the total of $y$ and $n$ does not exceed 5.

5. A stabilizer combination in accordance with claim 1 in which the organic phosphite triester has the formula $(RA)_3P$ in which A is selected from the group consisting of oxygen and sulfur and mixtures thereof, and R is selected from the group consisting of aryl, alkyl, cycloalkyl, aralkyl and alkaryl groups aggregating a total of not more than about sixty carbon atoms.

6. A stabilizer combination in accordance with claim 1 in which the thiodipropionic acid ester has the formula:

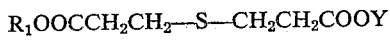

where $R_1$ is an organic radical selected from the group consisting of hydrocarbon radicals, hydroxyalkyl and hydroxyalkyloxyalkylene radicals; and esters thereof with aliphatic carboxylic acids; and Y is selected from the group consisting of hydrogen, a second R radical and a polyvalent metal M of Group II of the periodic table, and a polymeric chain of thiodipropionic acid ester units,

where Z is selected from the group consisting of hydrogen, $R_2$ and M, and X is a bivalent hydrocarbon group of the type of $R_1$, selected from the group consisting of hydrocarbon radicals, hydroxyalkylene and hydroxyalkyloxyalkylene radicals; and esters thereof with aliphatic carboxylic acids, the thiodipropionic acid ester having a total of from about ten to about sixty carbon atoms per sulfur atom, and $n$ representing the number of thiodipropionic acid ester units in the chain and ranges upwards from 0.

7. A stabilizer combination in accordance with claim 1 in which the phenol is 4,4'-thiobis(2-tertiary-butyl-5-methyl phenol), the phosphite is isooctyl diphenyl phosphite and the ester of thiodipropionic acid is dilauryl thiodipropionate, and which also comprises from about 0.05 to about 30 parts by weight of zinc 2-ethylhexoate.

8. A stabilizer combination in accordance with claim 1 in which the phenol is 4,4'-n-butylidene-bis(3-methyl-6-tertiary-butyl phenol), the phosphite is isooctyl diphenyl phosphite and the ester of thiodipropionic acid is dilauryl thiodipropionate, and which also comprises from about 0.05 to about 30 parts by weight of zinc 2-ethylhexoate.

9. A stabilizer combination in accordance with claim 1 in which the phenol is 4,4'-cyclohexylidene-bis (2-tertiary-butyl phenol), the phosphite is isooctyl diphenyl phosphite and the ester of thiodipropionic acid is dilauryl thiodipropionate.

10. A stabilizer combination in accordance with claim 1 in which the phenol is 4,4'-isobutylidene-bis (2-tertiary-butyl phenol), the phosphite is isooctyl diphenyl phosphite and the ester of thiodipropionic acid is dilauryl thiodipropionate, and which also comprises from about 0.05 to about 30 parts by weight of zinc 2-ethylhexoate.

11. A stabilizer combination in accordance with claim 1 in which the organic phosphite is isooctyl diphenyl phosphite, the phenol is 4,4'-cyclohexylidene-bis(2-tertiary-butyl phenol), and the ester of thiodipropionic acid is dilauryl thiodipropionate, and which also comprises from about 0.05 to about 30 parts by weight of zinc 2-ethylhexoate.

12. A stabilizer combination in accordance with claim 1 in which the organic phosphite is phenyl-di-2-ethylhexyl phosphite, the phenol is 4,4'-thiobis(2-tertiary-butyl-5-methyl phenol), and the ester of thiodipropionic acid is dilauryl thiodipropionate, and which also comprises from about 0.05 to about 30 parts by weight of zinc 2-ethylhexoate.

13. A stabilizer combination in accordance wth claim 1 in which the thiodipropionic acid ester is dilauryl thiodipropionate the phenol is 2,6-di(tertiary-butyl-4-methyl phenol), and the phosphite is tri(nonylphenyl) phosphite, and which also includes from about 0.05 to about 30 parts by weight of zinc 2-ethylhexoate.

14. A stabilizer combination in accordance with claim 1 in which the thiodipropionic acid ester is di-(2-ethylhexyl) thiodipropionate, the phenol is 4,4'-thiobis(2-tertiary-butyl-5-methyl phenol), and the phosphite is isooctyl diphenyl phosphite, and which also contains from about 0.05 to about 30 parts by weight of zinc 2-ethylhexoate.

15. A stabilizer combination for use in improving resistance of polypropylene to deterioration in physical properties on exposure to light and heat, consisting essentially of:
    (a) a transesterified reaction product of an organic phenol in an amount of from about 1 to about 20 parts by weight of an organic phosphite triester free from phenolic hydroxyl groups in an amount of from about 0.1 to about 50 parts by weight, obtained by a transesterification of the phenol and phosphite at an elevated temperature sufficient to form a homogeneous mixture, and
    (b) an ester of thiodipropionic acid in an amount of from about 0.1 to about 40 parts by weight; and
    (c) a salt of an organic non-nitrogenous monocarboxylic acid having from about six to about twenty-four carbon atoms and a metal of Group II of the periodic table in an amount of from about 0.05 to about 30 parts by weight, said stabilizer combination being compatible with polypropylene and having a low vapor pressure at polypropylene working temperatures.

16. A stabilizer combination in accordance with claim 15 in which the organic salt is an aliphatic fatty acid salt.

17. A stabilizer combination in accordance with claim 15 in which the metal salt is zinc-2-ethylhexoate.

18. A polypropylene composition having improved resistance to discoloration and embrittlement on ageing and heating comprising polypropylene and from about 0.005 to about 5% by weight of a stabilizer combination in accordance with claim 1.

19. A propylene composition in accordance with claim 18 in which the polypropylene is isotactic polypropylene.

20. A polypropylene composition having improved resistance to discoloration and embrittlement on ageing and heating comprising polypropylene and from about 0.005 to about 5% by weight of a stabilizer combination in accordance with claim 15.

References Cited by the Examiner
FOREIGN PATENTS
577,252   7/1959   Belgium.

LEON J. BERCOVITZ, *Primary Examiner.*